United States Patent [19]

Woog

[11] Patent Number: 4,608,177

[45] Date of Patent: Aug. 26, 1986

[54] EFFLUENT PRECIPITATION AND NEUTRALIZATION CHAMBER

[76] Inventor: Gunter Woog, 5435 Bauers Dr., West Bend, Wis. 53095

[21] Appl. No.: 689,434

[22] Filed: Jan. 7, 1985

[51] Int. Cl.⁴ .............................. C02F 1/52; C02F 1/66
[52] U.S. Cl. .................................. 210/738; 75/118 P; 210/207; 210/519; 210/912; 210/919; 430/399
[58] Field of Search .............. 75/118 P; 210/702, 714, 210/724, 738, 198.1, 199, 202, 205–207, 232, 919, 721, 912, 519; 430/399, 400

[56] References Cited

U.S. PATENT DOCUMENTS

| | | | |
|---|---|---|---|
| 2,263,398 | 11/1941 | Robinson | 210/207 |
| 2,640,807 | 6/1953 | Rice | 210/721 |
| 3,099,623 | 7/1963 | Kaufer | 210/167 |
| 3,502,577 | 3/1970 | Hutchins et al. | 210/702 |
| 3,541,008 | 11/1970 | Spinola | 210/721 |
| 3,721,624 | 3/1973 | Fisch et al. | 210/721 |
| 3,736,239 | 5/1973 | George et al. | 210/702 |
| 3,829,807 | 8/1974 | Anderson | 210/721 |
| 4,240,617 | 12/1980 | MacKay | 266/170 |
| 4,331,473 | 5/1982 | King, Jr. | 75/118 P |
| 4,394,270 | 7/1983 | Hartmann et al. | 210/726 |

FOREIGN PATENT DOCUMENTS 1353805  5/1974  United Kingdom ............. 75/118 P

Primary Examiner—Peter Hruskoci
Attorney, Agent, or Firm—Fuller, House & Hohenfeldt

[57] ABSTRACT

An effluent precipitation and neutralization chamber is useful for treating x-ray photographic chemicals prior to discharging them into a drain. Desilvered photographic fixer is mixed with spent developer within the chamber. The resulting iron precipitates settle to the bottom of the chamber or adhere to ribbon-like flow restrictors within the chamber. Relatively clear fluid of approximately neutral pH concentration is discharged to the drain. The chamber is openable for removing and properly disposing of the iron precipitates.

3 Claims, 3 Drawing Figures

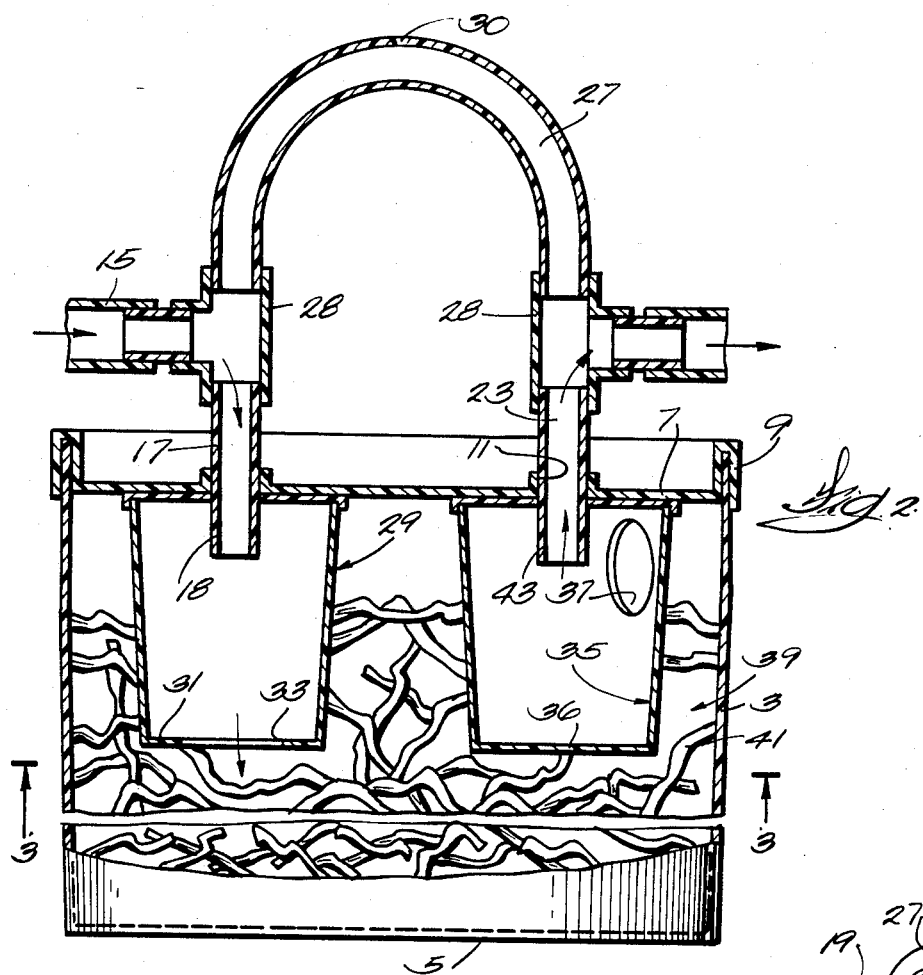

EFFLUENT PRECIPITATION AND NEUTRALIZATION CHAMBER

BACKGROUND OF THE INVENTION

1. Field of the Invention

This invention pertains to apparatus for treating photochemicals, and more particularly to apparatus for preventing spent photo chemicals from clogging drains.

2. Description of the Prior Art

The chemistry associated with x-ray photography is well known. When a film coated with a silver emulsion, usually in the form of a silver halide, is exposed to light energy, the exposed portion of the emulsion is converted to metallic silver. The film is "developed" by treating it with an alkaline solution which makes the metallic silver more visible. Thereafter, a "fixer" is applied to the film which dissolves and carries away the silver emulsion not converted to metallic silver. Accordingly, the spent fixer solution, which is normally of an acidic nature, contains significant quantities of silver.

It is a common practice to recover the silver in the fixer solution by replacing the silver ions with iron in known chemical reactions. After being desilvered by an iron-for-silver exchange, the fixer solution is usually an opaque reddish milky liquid. The iron in the solution is in the form of ferrous oxide, and it may be present as a colloidal dispersion. Conventionally, the desilvered fixer solution is flushed down a drain. If an alkaline substance is present, the iron will precipitate in the drain. As a result, the drain frequently becomes clogged, which is a serious problem and can result in flooding an x-ray processing area. To avoid drain clogging, the acidic desilvered fixer solution and the alkaline spent developer solution may be flushed down separate drains. Since duplicate drains are expensive and are not always available, the practice of flushing the fixer with copious quantities of water is also commonly employed, thereby flushing away the iron oxides before they can form deposits in the drain. That practice is wasteful of water and often merely delays the clogging problem rather than eliminating it. Other practices to avoid drain clogging include periodic treatment of the drain with an acid type drain cleaner. That procedure, too, does not address the cause of the problem but merely treats the result.

Thus, a need exists for preventing desilvered fixer solution from clogging a drain when exposed to an alkaline developer solution.

SUMMARY OF THE INVENTION

In accordance with the present invention, apparatus is provided which collects precipitated iron from a spent and desilvered photographic fixer solution before the solution enters a drain. This is accomplished by apparatus which includes an enclosed effluent precipitation and neutralization chamber for receiving and mixing the spent developer and fixer solutions and for removing the precipitated iron prior to discharging the mixed solution to the drain.

The chamber is defined by a vessel having a closed bottom wall and a top cover containing ports for passing the fluids therethrough. At least two ports are used as fluid inlets. One inlet conducts spent developer into the chamber, and another inlet conducts spent and desilvered fixer. At least one and preferrable two ports in the cover serve as outlets for conducting the mixed fluid to the drain. To accommodate overflow conditions, each inlet is also connected directly to an outlet by conduits located outside the chamber. To compensate for varying liquid levels within the container, air vents are provided on the outside connections between the inlet and outlets.

The chamber is filled to a substantial degree with flow restrictors which force the fluid to follow tortuous paths as it flows in the chamber from the inlet to the outlet. Preferably, the flow restrictors are in the form of long lengths of flexible ribbons composed of a material which is impervious to photographic chemicals. The purpose of the flow restrictors is to ensure the complete mixing of the developer and fixer within the chamber.

As the developer and fixer intermix, the iron in the fixer precipitates out of solution. The relatively large volume of the container permits the fluids to flow with a low velocity, thereby giving the precipitated metal particles sufficient time to settle to the bottom of the chamber. In addition, the ribbons provide a large surface area to which precipitated iron may adhere. The chamber requires cleaning at intervervals which depend on the quantity of developer and fixer flowing through the invention. Access to the chamber is accomplished by removing the cover.

To further promote mixing of the developer and fixer, the inlets do not open directly into the chamber, but rather into a mixing vessel surrounding the incoming fluid streams. The mixing vessel in turn discharges into the effluent chamber. In a similar manner, to assure that the discharged fluid contains as little iron precipitate as possible, the outlets are surrounded by a baffle having an inlet port as close to the top of the effluent chamber as possible.

Other objects and advantages of the invention will become apparent to those skilled in the art from the disclosure.

BRIEF DESCRIPTION OF THE DRAWINGS

FIG. 1 is a perspective view of the effluent precipitation and neutralization chamber of the present invention;

FIG. 2 is a vertical sectional view taken along lines 2—2 of FIG. 1; and

FIG. 3 is a sectional view taken along lines 3—3 of FIG. 2.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Referring to FIG. 1, an effluent precipitation and neutralization chamber 1 is illustrated which includes the present invention. The chamber finds particular usefulness in treating spent photographic chemicals prior to flushing them down a drain, but it will be understood that the invention is not limited to photographic applications.

The effluent precipitation and neutralization chamber 1 may be fabricated as a hollow generally cylindrical container 3 having a bottom wall 5 and an open top. The container top is closed by a cover 7 having a peripheral portion 9 of any suitable design adapted to provide a liquid-tight seal with the container 3. The peripheral portion 9 is designed to be easily removed from and replaced on the container, as will be explained hereinafter.

The cover 7 defines a plurality of ports 11. Preferrably, the ports 11 are arranged in pairs. Conventional tubing or other liquid conduits 13 connect two different sources of chemicals, not shown, to a drain, not shown, with the effluent precipitation and neutralization chamber 1 interposed in the path between the chemical sources and the drain. In particular, tubing 15 is connected to a first chemical source, and the first chemical enters the chamber 1 by means of a short tubing section 17 extending through a port 11 and terminating in an end 18, FIG. 2. In a similar manner, tubing 19 is connected to a second chemical source, and the second chemical enters the chamber through short vertical tubing section 21 terminating in tubing end 22, FIG. 3. A mixture of the two chemicals leaves the chamber by means of one or more short vertical outlet tube sections 23 and tubing 25. To provide a bypass around the chamber should a blockage occur therein, upwardly looped outside tubings 27 connect the inlet tubes 15 and 19 to the outlet tubes 25 by means of tees 28. Apertures 30 at the topmost portions of the tubings 27 permit equilization of the air pressure inside and outside the chamber.

To enhance mixing of the two chemicals entering the chamber 1 through tubes 17 and 21, a preliminary mixing vessel is fastened to the underside of the cover 7 for receiving the liquids entering the chamber. In the illustrated construction, the preliminary mixing vessel is a relatively small hollow cylinder 29. The diameter of the cylinder 29 is sufficient to surround the tubing ends 18 and 22, so that the streams of fluid from tubings 17 and 21 discharge into the cylinder. The cylinder has a bottom wall 31 which defines an opening 33 through which the two partially mixed chemicals pass into the container 3.

To further promote mixing of the chemicals, the present invention includes a flow restrictor 39 which requires the fluids to follow tortuous paths between the inlets 17 and 21 and the outlets 23. In the preferred embodiment, the flow restrictor 39 is in the form of one or more long lengths of flexible ribbons 41 which are folded randomly and packed relatively tightly within the container 3. It has been found that plastic package banding material is suitable for use as the flow restricting ribbons. That material is light weight, inexpensive, easily deformed, and resistant to many chemicals. The numerous devious paths followed by the fluid causes complete intermixing. The relatively large size of the container allows the liquids to flow with a low velocity. Thus, suspended matter in the fluid has time to settle to the bottom wall 5 or to adhere to the ribbons 41. Consequently, the clearest liquid is at the top of the container. To assure that only the clearest liquid possible is discharged, the ends 43 of the outlet tubes 23 projecting inside the container are surrounded by a baffle attached to the inside of the cover 7. The baffle may be a hollow cylinder 35 having a closed bottom wall 36 and one or more ports 37 located as close to the cover as possible. The ports 37 are placed in the cylinder 35 as far from the mixing vessel opening 33 as possible. Accordingly, only the clearest liquid, i.e., the liquid containing the least amount of suspended matter, leaves the container through the tubes 23.

The operation of the effluent precipitation and neutralization chamber of the present invention will be described in conjunction with an x-ray photographic developer and fixer. It will be assumed that the tube 15 is connected to a source of spent developer. The spent developer is usually highly alkaline, having a pH concentration as high as 11.5. It will be further assumed that the tubing 19 is connected to a source of photographic fixer which has been desilvered by exchanging the silver dissolved therein with iron. The desilvered fixer is usually quite acidic, having a pH concentration as low as 4.5. The developer and fixer enter the chamber 1 by means of vertical tubing sections 17 and 21, respectively, and they flow into mixing cylinder 29 where they are partially mixed, thereby causing some iron in the fixer to precipitate. The partially mixed liquids flow out of opening 33 and into the container 3 and toward the outlet sections 23. The relatively large volume of the container enables the developer and fixer to flow slowly from the inlets to the outlets, thus maximizing the time they are in contact. In addition, the low flow velocity prevents agitation of the precipitated particles. The developer and fixer follow the tortuous paths created by the ribbons 41 as they flow toward the outlet sections 23, thereby becoming completely mixed and neutralizing each other. Besides promoting complete intermixing and corresponding maximum iron precipitation, the bands provide a large area to which the iron precipitate may adhere, thereby functioning somewhat as a filter. Other precipitated particles settle to the bottom of the container. The liquid near the top is relatively clear. That liquid, which has a relatively neutral pH number, flows through ports 37 and tubing sections 23 to outlet tubings 25 and on to the drain.

The precipitation and collection of the iron within the effluent precipitation and neutralization chamber of the present invention rather than in a sewer drain is of great benefit. A secondary benefit of the invention is that the formation of limestone deposits in the drain is also reduced. Normally, limestone deposits are created by dissolved calcium and magnesium in the drain water reacting with the carbonates of an alkaline developer. However, because the alkalinity of the developer is greatly reduced within the chamber 1 and the discharged liquid has a relatively neutral pH concentration, the chemical reactions which create limestone deposits are correspondingly reduced.

The effluent precipitation and neutralization chamber of the present invention is designed to accumulate iron deposits for six months to a year before cleaning is required. Cleaning is readily accomplished by removing the container 3 from the cover 7, which may remain in place in the lines 15, 19, and 25. The iron precipitate may then be properly disposed of. After the ribbons 41 and container have been cleaned, the container, with the ribbons repacked therein, is rejoined to the cover. The design of the cover periphery 9 permits repeated cleaning without detrimental effect to the seal between the container and cover.

Thus, it is apparent that there has been provided, in accordance with the invention, an effluent precipitation and neutralization chamber which fully satisfies the aims and advantages set forth above. While the invention has been described in conjunction with specific embodiments thereof, it is evident that many alternatives, modifications, and variations will be apparent to those skilled in the art in light of the foregoing description. Accordingly it is intended to embrace all such alternatives, modifications, and variations as fall within the spirit and broad scope of the appended claims.

I claim:

1. Apparatus for treating fluids prior to discharge thereof to a drain comprising:
   a. a container having an opening;
   b. cover means for removably covering and sealing the container opening;
   c. inlet means in the cover means for conducting at least two different fluids into the container;
   d. outlet means in the cover means for discharging the fluids from the container, mixing means fastened to the inside of the cover means for preliminarily mixing the fluids as they enter the container, the mixing means comprising a hollow vessel having wall means for surrounding the streams of fluid entering the container from the inlet means and for defining an opening therethrough to permit the partially mixed incoming fluids to pass from the hollow vessel to the inside of the container;
   e. restrictor means within the container for providing tortuous paths to the flow of the fluids to promote intermixing thereof, the restrictor means comprising at least one long length of flexible ribbon folded and packed within the container;
   f. outlet means in the cover means for discharging the fluids from the container; and
   g. a hollow cylinder fastened to the inside of the cover means and having wall means for surrounding the outlet means, the wall means defining at least one port therethrough located near the cover means and remote from the inlet means to permit only fluid from the top of the container to be discharged through the outlet means,
   so that the fluids introduced into the container are intermixed therein as they flow from the inlet means to the outlet means.

2. An effluent precipitation and neutralization chamber for neutralizing spent photographic developer and desilvered fixer and for collecting iron particles precipitated from the fixer comprising:
   a. container means having an open top for mixing the developer and fixer and for collecting the precipitated iron particles;
   b. cover means for releasably covering and sealing the open top of the container;
   c. inlet means mounted to the cover means for conducting the developer and fixer into the container means;
   d. a first hollow vessel fastened to the inside of the cover means and having a wall surrounding the streams of fluid entering the container means, the wall defining an opening therethrough to permit partially mixed incoming fluids to pass from the hollow vessel to the inside of the container means;
   e. an effective length of elongated flexible ribbon folded and packed inside the container for providing tortuous paths for the developer and fixer flowing within the container to promote mixing thereof and to promote precipitation of the iron particles;
   f. outlet means mounted to the cover means remote from the inlet means for discharging the mixed liquids from the container; and
   g. a second hollow vessel fastened to the inside of the cover means and having wall means for surrounding the outlet means, the wall means defining at least one port therethrough located near the cover means,
   so that the developer and fixer are mixed and neutralized and the iron is precipitated and collected within the chamber.

3. A method of treating spent photographic alkaline developer and acidic fixer that has been desilvered by exchanging silver dissolved therein with iron comprising the steps of:
   a. providing a chamber having at least two inlet conduits, at least one outlet conduit, an effective length of foldable flexible ribbon, a first hollow vessel having an opening therethrough and surrounding the inlet conduits, and a second hollow vessel defining at least one port therethrough and surrounding the outlet conduit;
   b. separately introducing the developer and fixer into the chamber by means of the inlet conduits;
   c. intermixing the developer and fixer within the chamber by flowing said developer and fixer through said first hollow vessel and along a tortuous path provided by said ribbon to cause metallic iron particles to precipitate out of the fixer;
   d. allowing the precipitated metallic particles to settle out of the fluid; and
   e. discharging clear mixed fluids from the chamber through said second hollow vessel,
   so that the developer and fixer are neutralized and the metallic particles are accumulated within the chamber prior to discharging the mixed developer and fixer into a drain.

* * * * *